Patented Aug. 5, 1952

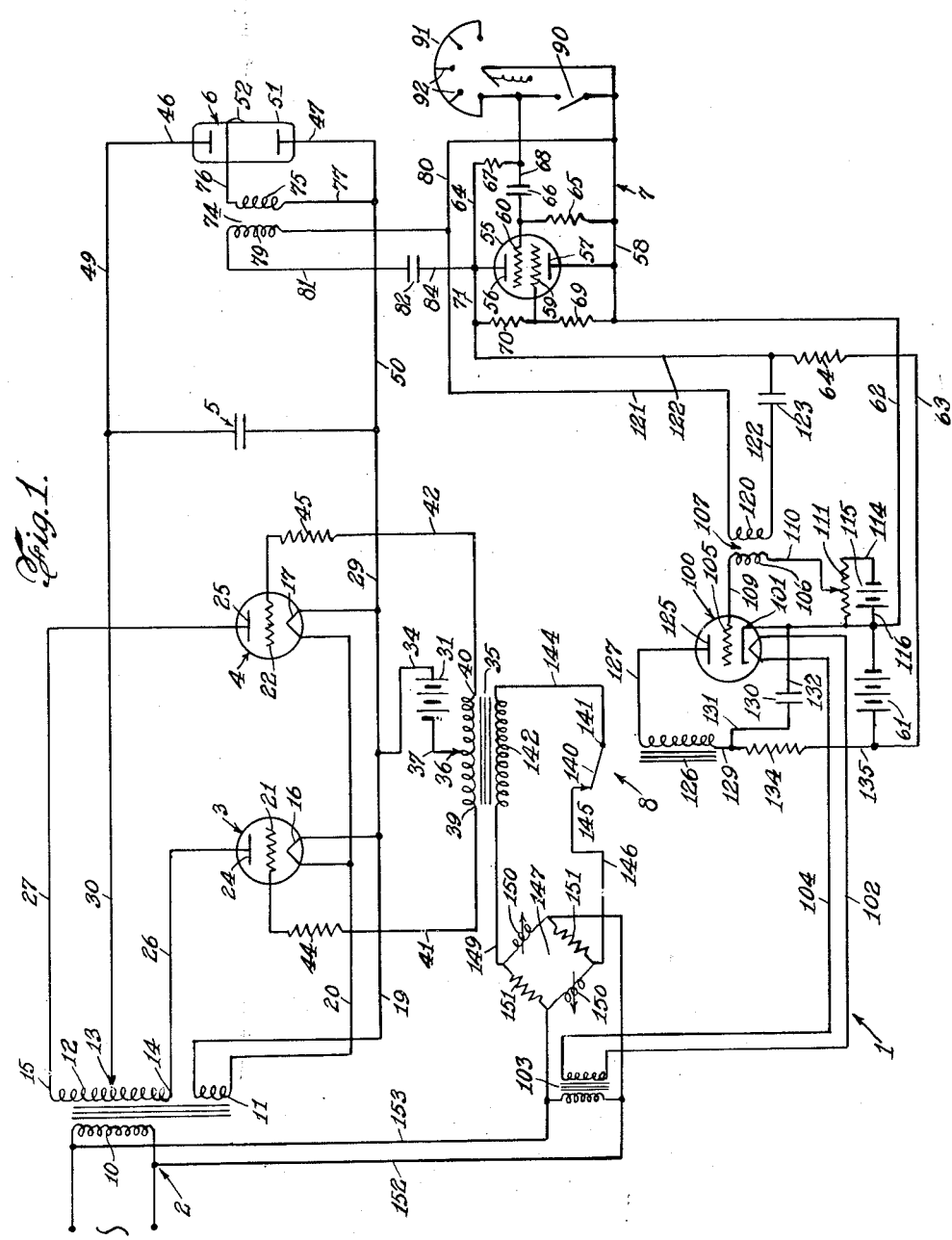

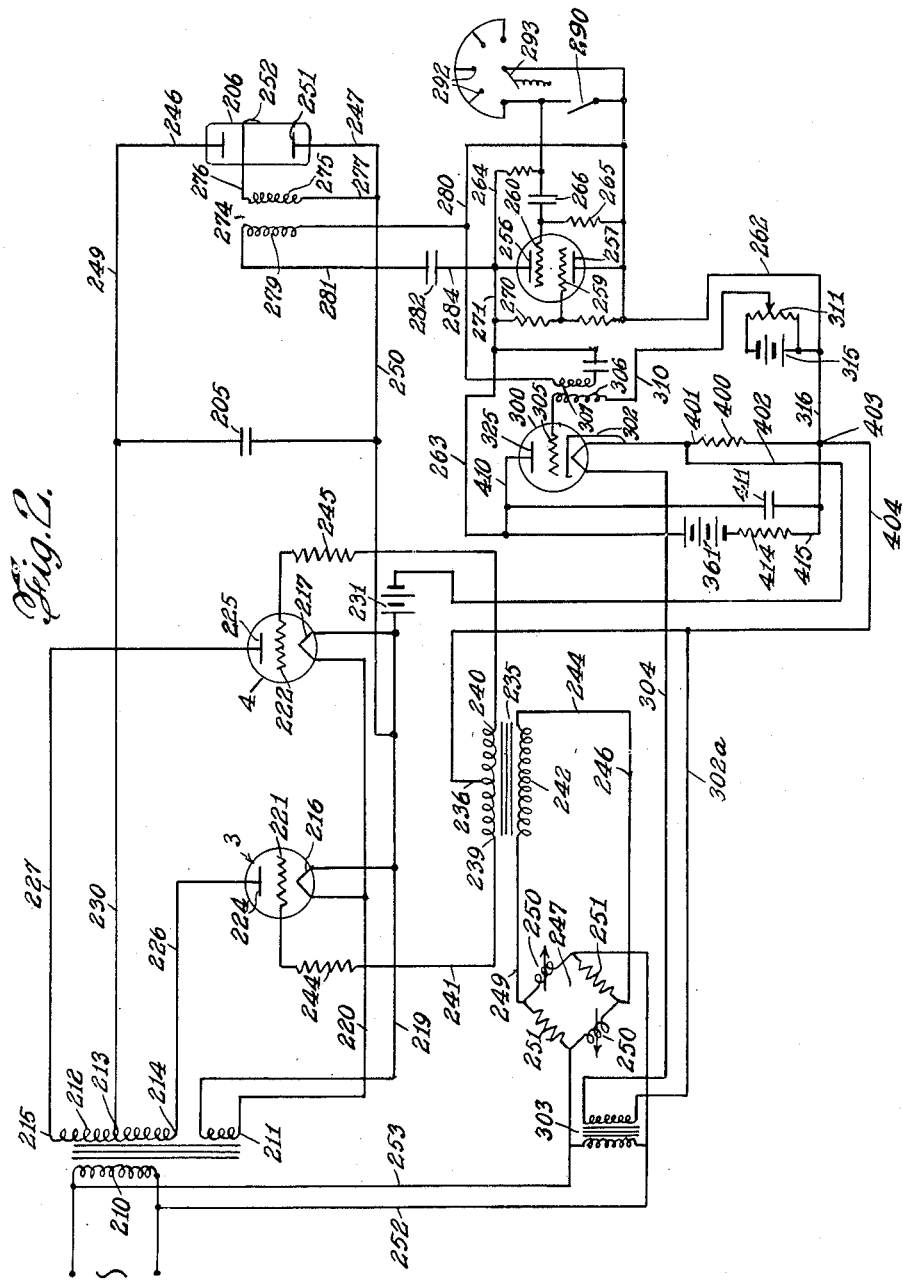

2,606,308

UNITED STATES PATENT OFFICE 2,606,308

ELECTRONIC FLASH DEVICE

Harry L. Parker, St. Albans, N. Y., assignor to American Speedlight Corporation, New York, N. Y.

Application March 15, 1951, Serial No. 215,728

12 Claims. (Cl. 315—237)

This invention relates to electrical apparatus, and more particularly to an electronic flash device capable of rapid intermittent operation for use, among other purposes, for photographic illumination.

An electronic flash device includes a flash producing tube in which a brilliant flash is produced for a very short duration by a discharge of electric current through the tube. Generally the electric energy for the flash is stored in a capacitor charged from either rectified alternating or from a direct current supply. The amount of light produced by any specific tube construction depends to a great extent upon the amount of energy in the discharge, and thus is proportional to the charge in the capacitor.

The discharge in the flash tube takes place from the storage capacitor between two electrodes positioned in the flash tube which may contain a suitable gas, the design of the flash tube varying somewhat in different constructions as to its shape and as to the amount and kind of gas filling. The discharge through the tube is controlled by a trigger electrode which may be wrapped around the flash tube and which is connected to a comparatively low capacity and low voltage control circuit. In order to discharge the flash tube a surge or pulse is impressed on the trigger electrode which causes ionization of the gas in the flash tube providing a conducting path for the discharge of the storage condenser. The charging of the capacitor is generally accomplished by providing a rectifier in series with the capacitor and the secondary of a high voltage step-up transformer.

In some applications of the flash tube, it has been found desirable to provide a plurality of flashes in rapid succession, such as when making an exposure requiring a greater quantity of light than is provided by a single flash. In systems where large capacity is concerned and where rapid recharge is desired for fast successive discharge, it has been found that the output current capacity of the rectifier-high voltage transformer circuit is such as to continue an arc in the flash tube after the capacitor has been discharged. In systems of low current capacity, the recharge time of the capacitors is relatively long and the current through the tube from the rectifier is not enough to maintain the gas in the flash tube in an ionized condition.

Heretofore, attempts have been made to overcome this difficulty as by introducing an impedance into the supply circuit or in the plate circuit of the rectifier to provide a voltage drop, in other cases supply transformers have been provided with high impedance secondary windings. However, such solutions have not been wholly satisfactory particularly for conditions in which there is a variation in the supply voltage in which case the inherent poor regulation of the impedance prevents the proper charging of the capacitor within the allowable recharge time and thus results in a non-uniform light output of the flash tube.

It is believed that the most practical solution of the problem is to effectively disconnect the supply from the capacitor for a short period of time following its discharge through the flash tube so as to allow the flash tube to become deionized, the time interval required being of the order of about one-one hundredth of a second. In cases where rapid successive discharge is required, as for example, in more than one discharge per second, it is not practical to provide mechanical switching for the high voltage supply because of the size and expense of the equipment, and because of the difficulty in obtaining switching equipment sufficiently rapid in its action and capable of handling the magnitude of current and voltage required.

The present invention aims to overcome the difficulties and disadvantages of utilizing high voltage supply switching by providing electronic control means for automatically blocking the power supply at the instant the capacitor is discharged through the flash tube, and for automatically removing the blocking of the power supply after a predetermined time interval has elapsed for the flash tube to deionize so that the capacitor will be rapidly charged again to the proper energy level for the next discharge.

Another object of the present invention is to provide an improved high power flash tube charging system simple and economical in construction and efficient in operation.

In accordance with the invention the foregoing objects are accomplished by providing grid controlled rectifying means for charging the capacitor in which the firing of the rectifier is controlled by a pulse supplied simultaneously with the supply of the discharge pulse to the trigger electrode of the flash tube.

Other objects and advantages of the invention will be apparent from the following description and from the accompanying drawings, which show, by way of examples embodiments of the invention.

In the drawings:

Figure 1 is a schematic diagram of one form of electronic flash device in accordance with the invention in which a mechanical relay is included in the charging circuit control.

Figure 2 is a schematic diagram of another form of electronic flash device in accordance with the invention in which all of the controls in the charging circuit are electronic.

Referring to the drawings there is shown in Figure 1 an electronic flash device 1 in accordance with the invention and including a transformer 2 adapted to be connected to an alternating current source to supply grid-controlled thyratron tubes 3 and 4 to provide full wave rectification to a supply capacitor 5 for a flash tube 6. The discharge of the capacitor 5 is controlled by a trigger circuit generally indicated by numeral 7. The control and blocking circuit 8 for the thyratrons 3 and 4 is used to regulate the charging of the capacitor 5.

The transformer 2 is provided with a primary winding 10, a filament supply winding 11 and a secondary winding 12 having a midtap 13 and outer terminals 14 and 15.

The thyratrons 3 and 4 may be of the type known as #5563 and are gas filled and, respectively, have cathodes 16 and 17 connected to the filament secondary 11 by wires 19 and 20. The tubes are controlled by grids 21 and 22 interposed between the cathodes 16 and 17 and anodes or plates 24 and 25. By reason of the construction of the tubes 3 and 4 they are adapted to pass current from their cathodes to their anodes upon the application of a suitable grid potential.

In order that full wave rectification may be had for the charging of the capacitor 5, the transformer secondary terminals 14 and 15 are connected to the plates 24 and 25 by connecting wires 26 and 27 and the cathodes 16 and 17 are connected to output lead 29. The midpoint 13 of the transformer secondary 12 is connected to one terminal of the capacitor 5 by output lead 30, the other terminal of the capacitor being supplied by the output lead 29.

A negative bias for the grids is provided by a battery or negative voltage supply 31 connected to the cathode circuit by a lead 34. A peaking transformer 35 has its midtap 36 connected to one side of the grid bias 31 by a lead 37. Terminals 39 and 40 of the peaking transformer 35 are respectively connected to the grids 21 and 22 by leads 41 and 42 through grid resistances 44 and 45. The peaking transformer is used to provide a sharp cut-off for the grid control voltage.

The capacitor 5 may be of any desired type suitable to withstand the voltage of the applied circuit and having a capacitance sufficient to provide the desired quantity of energy in the flash from the tube 6. The capacitor is connected to electrode terminals 46 and 47 of the tube 6 by wires 49 and 50.

The flash tube 6 may be of the type known as FT 500 and is made with a glass envelope 51 which is gas filled with Xenon or other suitable gas, the electrodes 46 and 47 extending into the gas filled chamber. A triggering electrode 52 is wound about the envelope 51 of the tube 6 and is adapted when subjected to a voltage surge or pulse of electricity to initiate ionization of the gas within the envelope 51, thus, causing it to become a conductor and permitting the capacitor 5 to discharge between the electrodes 46 and 47.

The trigger circuit 7 includes a cold cathode tube 55 of the type known as SN 4 and having electrodes 56 and 57 and grids 59 and 60. A battery or direct current power supply 61 is connected to the trigger circuit by leads 62 and 63 a resistor 64 being incorporated in lead 63. The electrode 57 is connected to the supply lead 62 and a tap connection 58 made to a resistor 65 which has its other terminal connected to the grid 60. A capacitor 66 is connected between the grid 60 and a resistor 67 by a lead 68, thence to the electrode 56 by a lead 64. The direct current supply lead 62 is connected to the grid 59 with a series resistor 69 therebetween. Another resistor 70 is connected between the grid 59 and the electrode 56 by a lead 71.

The triggering surge or pulse is conveyed to the flash tube 6 by a triggering transformer 74 which has one terminal of its secondary 75 connected to the triggering electrode 52 by a lead 76 and its other terminal connected to the capacitor output wire 50 from the capacitor 5 by a lead 77. The primary 79 of the trigger transformer 74 has one lead connected to the cathode electrode 57 and the resistors 65 and 69 by a wire 80. The other terminal of the primary winding 79 is connected by a wire 81 to a capacitor 82 in turn connected by a lead 84 to the anode electrode 56. A switch 90 is connected across the wires 58 and 68 for single flashing of the tube 6. In addition, for alternative use for the rapid successive flashing of the tube 6, a multicontact switch 91 is connected in parallel with the switch 90. The switch 91 has a plurality of contacts 92 adapted to be swept by a spring urged midpoint contact member 93 in any suitable construction to provide a succession of contact of successive make and break connections between the wires 58 and 68, suitable time delay means being provided to assure the deionization of the tube 6. The switch 91 may be of the type commonly used for dialing in telephone machine switching, or might be a motor-powered rotatable switch timed in rotation for the required operation.

The operation of the trigger tube circuit is well known in the art and is initiated by a momentary pulse applied to the grid 60. In the static condition the voltage of power supply 61 is applied across the cold cathode tube 55 and the capacitors 82 and 123 which are charged to the full voltage of the power supply 61. Likewise capacitor 66 is charged through resistors 65 and 67 to the same voltage. The grid 59 is biased to a positive voltage with respect to cathode 57 by the proper ratio of voltage drops across the resistors 69 and 70. Grid 60 is maintained at the same potential as the cathode 57 as it is connected through resistor 65 through which there is no current flow.

When the trigger pulse is desired, terminal 68 is connected to the cathode 57 by actuation of either the switch 90 or, if successive pulses are desired, by actuation of the multiple contact switch 91. At the instant that terminal 68 of the capacitor 66 is connected to the cathode 57 by one or the other of the switches 90 or 91 the full voltage of the capacitor appears across the resistor 65 thereby applying a voltage pulse to the grid 60. This voltage pulse ionizes the gas in the cold cathode tube 55 allowing the capacitor 82 to discharge through the primary winding 79 of the triggering transformer 74. The discharge of the capacitor 82 through the primary winding 79 induces a high voltage pulse in the secondary winding 75 which, in turn, ionizes the gas in the flash tube 51. Simultaneously the capacitor 123 discharges through the primary winding 120 as will be hereafter described.

The control and blocking circuit 8 for the thyratrons 3 and 4 includes a cathode tube 100 of the type known as #2050 having a heated cathode 101 supplied from the filament transformer 103 by leads 102 and 104.

A surge or pulse is conveyed to the tube 100 from the triggering circuit 7 through grid 105 connected to one terminal of a secondary winding 106 of an isolating transformer 107 by a lead 109, the other terminal of the winding 106 being connected by a lead 110 to a potentiometer 111, in turn, connected by a lead 114 to one terminal of a grid bias battery 115 or bias power supply. The other terminal of the bias supply is connected to the cathode 101 by lead 116. Supply winding 120 of the pulse transformer 106 is fed by wire 121 from wire 80 and through wire 122 and a series capacitor 123 from wire 71 so as to provide a parallel connection with the primary 79 of the triggering transformer 74. The plate 125 of the tube 100 is connected to a terminal of a relay 126 by wire 127. The other terminal of the relay 126 is connected by a lead 129 to a capacitor 130 through a lead 131, thence to the cathode 101 by a lead 132. A resistor 134 is connected from the relay lead 129 to the battery 61 by a wire 135. The relay 126 has an inherent time delay because of its mechanical construction of the order of about two cycles and is adapted when energized to open a switch 140 to disconnect a phase shift positive grid voltage to be later described. The switch 140 has one terminal 141 connected to primary 142 of the peaking transformer 35 by a lead 144. Terminal 145 of the switch 140 is connected by a lead 146 to a phase shifting bridge 147, the bridge 147 having its other output terminal connected to primary winding 142 by lead 149.

The phase shifting bridge 147 is preferably of the type described in my co-pending application for an Electronic Flash Device application #215,727, filed March 15, 1951, or alternatively may include a pair of variable reactors 150 connected in a bridge circuit with a pair of resistors 151 the bridge being supplied from an alternating current source by wires 152 and 153.

In the operation of the electronic flash device it is connected to a suitable alternating current supply. Alternating current is passed from the secondary 12 of the transformer 10 to the thyratrons 3 and 4 to be rectified to direct current to charge the capacitor 5. The relay switch 140 is normally in the closed position and thus, depending upon the output of the phase shifting bridge 147, and upon the amount of negative bias from the battery 31, control is had through the rectifier grids 21 and 22 to vary the rate of charge of the condenser 5. As previously stated, to discharge the capacitor 5 either of the switches 90 or 91 is actuated thereby providing a pulse or surge through the triggering transformer 74 to ionize the gas in the flash tube 6 whereupon the capacitor 5 is discharged through the terminals 46 and 47 of the flash tube producing the desired flash of light.

In order to prevent continued conduction of the tube 6 and to allow it to deionize, the thyratrons 3 and 4 are effectively disconnected from charging the condenser 5 for a time interval determined by the inherent time constant of the relay 126 during its open-closed cycle. Actuation of the relay 126 is accomplished by a surge or pulse in the transformer 120 simultaneously produced with the triggering pulse in transformer 74. The pulse in the transformer 120 acts through the grid 105 of the tube 100 to trigger the tube to allow the capacitor 130 to discharge through the plate circuit of the tube 100 and thus through the coil of the relay 126 resulting in the opening of the relay switch 140 and the disconnection of the bridge 147 from the circuit whereby the normal negative bias of the battery 31 renders the thyratrons blocked or non-conducting for the time interval while the relay switch 140 is in the open position. The action of the switch 93 is made with a time delay so that the movement of the switch blade 93 from one contact 92 to the adjoining contact 92 is greater than the time constant of the relay 126.

Another embodiment of the invention is shown in Figure 2 in which corresponding parts are designated by the same reference numerals as in Figure 1 with the addition of 200. In Figure 2 there is shown an electronic flash device differing from the first embodiment in that the control for the thyratrons is achieved electronically. This is achieved by automatically injecting into the bias circuit for the thyratrons 3 and 4 an additional series voltage sufficient in magnitude to overcome the effective positive potential provided in the peaking transformer 235 by the alternating current voltage from the phase shifting bridge 247. The injected potential is derived from a control circuit including a tube 300 of the type #2050 and which includes a heated cathode 302a supplied from a filament transformer 303 by wires 302a and 304. Grid 305 is connected to one end of the winding 306 of isolating transformer 307, the other terminal of the isolating transformer winding 306 being connected to a potentiometer 311 by a wire 310. The potentiometer 311 is connected across a battery 315 then through a lead 316 to end 403 of the series resistance 400 having its cathode end 401 connected by a wire 402 to one terminal of the grid bias battery 231. End 403 of the resistor 400 is connected by a wire 404 to midtap 236 of the peaking transformer 235. Plate 325 of the tube 300 is connected by a lead 410 to one side of capacitor 411 and in parallel with one terminal of a battery 361 which has its other terminal connected in series with a resistor 414 which is then connected by a lead 415 to end 403 of the resistor 400.

In the operation of this embodiment of this invention the charging of the capacitor 205 is achieved as described in connection with the first embodiment as is the triggering of the flash tube 206. The triggering pulse produced in the transformer 74 and in transformer 307 simultaneously triggers the grid of the tube 300 to slowly discharge the capacitor 411 through the resistance 400 thereby providing a voltage drop across the terminals 401 and 403 which is added to the voltage produced by the battery 231, the resulting voltage being of a magnitude to oppose the effect of the potential produced by the phase shifting means 247.

From the preceding description it will be seen that the present invention provides an electronic flash device which is simple and economical in construction and which provides an automatic cut-off for the power supply to the capacitor until sufficient time has elapsed so that the flash tube has deionized thereby providing a hold-over flash which might be damaging to the tube and which would prevent a quick recharge of the condenser for successive flashes.

While the invention has been described and illustrated with reference to specific embodiments thereof, it will be understood that other embodiments may be resorted to without departing from the invention. Therefore, the forms of the invention set out above should be considered as illustrative and not as limiting the scope of the following claims.

I claim:

1. An electronic flash device comprising electrical supply means, gaseous flash discharge means, a capacitor to supply the flash discharge means, a rectifier to charge the capacitor, connection means between the capacitor and the supply means for the charging of the capacitor by the rectifier, connection means between the capacitor and the flash discharge means for the discharge of the capacitor to flash the discharge means, control means for initiating the discharge of the capacitor through the flash discharge means, grid control means for the rectifier, and connection means between the control means and the rectifier grid control means, whereby the rectifier is rendered inoperative upon the actuation of the control means for flashing the discharge means.

2. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to the flash initiating means to render the rectifier inoperative, and time delay means to maintain the rectifier inoperative for a predetermined time interval to allow the flash tube to deionize.

3. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to the flash initiating means to render the rectifier inoperative, and relay means having a time delay constant to maintain the rectifier inoperative for a predetermined time interval to allow the flash tube to deionize.

4. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to the flash initiating means to render the rectifier inoperative, including a second grid controlled electronic tube responsive to the control means for initiating the discharge through the flash tube, and a time delay relay responsive to the plate circuit of the second tube to control the rectifier grid to maintain the rectifier inoperative for a predetermined time interval to allow the flash tube to deionize.

5. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to the flash initiating means to render the rectifier inoperative, including negative biasing means for the rectifier grid, phase shifting means for the rectifier grid adapted to act in opposition to the negative biasing means, and circuit opening means for the phase shifting means to maintain the rectifier inoperative for a predetermined time interval to allow the flash tube to deionize.

6. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to the flash initiating means to render the rectifier inoperative, including negative biasing means for the rectifier grid, phase shifting means for the rectifier grid adapted to act in opposition to the negative biasing means, a second grid controlled electronic tube responsive to the flash initiating control means, and a time delay relay responsive to current in the plate circuit of the second tube and operatively connected to open the phase shifting circuit to maintain the rectifier inoperative for a predetermined time interval to allow the flash tube to deionize.

7. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to the flash initiating means to render the rectifier inoperative, including negative biasing means for the rectifier grid, and a second grid controlled electronic tube responsive to the control means for initiating the discharge through the flash tube operative to apply the negative bias to the rectifier to maintain the rectifier inoperative for a predetermined time interval to allow the flash tube to deionize.

8. An electronic flash device comprising a flash tube, a capacitor to store energy to flash the tube, means for charging the capacitor including a grid-controlled rectifier, control means to initiate the discharge of the capacitor through the flash tube, control means for the rectifier grid responsive to the flash initiating means to render the rectifier inoperative including first negative biasing means for the rectifier grid, phase shifting means for the rectifier grid adapted to act in opposition to the negative biasing means, a second grid controlled tube responsive to the flash initiating means, second negative bias means connected in series with the first negative bias means and operative by the second grid controlled tube and of a magnitude to oppose the effect of the phase shifting means, and time constant means for the second grid controlled tube to maintain the second negative bias means effective for a predetermined time to allow the flash tube to deionize.

9. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to flash initiating means to render the rectifier inoperative, including a second grid controlled electronic tube responsive to the control means for initiating the discharge through the flash tube, and a resistor connected in series in the plate circuit of the second electronic tube and in series with the grid circuit of the rectifier to control the rectifier grid to maintain the rectifier inoperative for a predetermined time interval to allow the flash tube to deionize.

10. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to the flash initiating means to render the rectifier inoperative, including first negative biasing means for the rectifier grid, a second grid controlled electronic tube responsive to the control means, and second negative biasing means adapted to add to the effect of the first negative biasing means responsive to the second grid controlled electronic tube.

11. An electronic flash device comprising a flash tube, a capacitor to store energy to flash the tube, means for charging the capacitor including a grid controlled rectifier, control means to initiate the discharge of the capacitor through the flash tube, control means for the rectifier grid responsive to the flash initiating means to render the rectifier inoperative, including first negative biasing means for the rectifier grid, grid control means for the rectifier grid adapted to act in opposition to the negative biasing means, a second grid controlled electronic tube responsive to the flash initiating control means, second negative biasing means to act in conjunction with the first negative biasing means responsive to the second electronic tube, and time delay means to control the second tube to maintain the rectifier inoperative for a predetermined time interval to allow the flash tube to deionize.

12. An electronic flash device comprising a flash tube, a capacitor to store energy to flash the tube, means for charging the capacitor including a grid-controlled rectifier, control means to initiate the discharge of the capacitor through the flash tube, control means for the rectifier grid responsive to the flash initiating means to render the rectifier inoperative including first negative biasing means for the rectifier grid, phase shifting means for the rectifier grid adapted to act in opposition to the negative biasing means, a second grid controlled tube responsive to the flash initiating means, an impedance common to the grid control of the rectifier and to the plate circuit of the second tube responsive to current through said plate current to provide voltage bias on the said grid to maintain the second negative bias means effective for a predetermined time to allow the flash tube to deionize.

HARRY L. PARKER.

No references cited.